Patented Feb. 27, 1923.

1,446,550

UNITED STATES PATENT OFFICE.

THURSTON N. DISSOSWAY, OF FLATBUSH, NEW YORK, ASSIGNOR TO DISSOSWAY CHEMICAL COMPANY, INC., OF BROOKLYN, NEW YORK, A CORPORATION OF NEW YORK.

PROCESS OF REMOVING IMPURITIES FROM RESORCINE.

No Drawing. Application filed December 13, 1920. Serial No. 430,417.

*To all whom it may concern:*

Be it known that I, THURSTON N. DISSOSWAY, a citizen of the United States, residing at Flatbush, Brooklyn Borough, county of Kings, city of New York, and State of New York, have invented a new and useful Improvement in Processes of Removing Impurities from Resorcine, of which the following is a full, clear, and exact description, reference being had to the accompanying drawings, which form a part of this specification.

The resorcine sold as technical resorcine almost invariably contains phenol and catechol. The U. S. Pharmacopoeia demands that U. S. P. resorcine shall be free from both these impurities.

The object of my invention is to remove these impurities, or either of them that may be present, from resorcine.

In carrying out my process I prefer to first grind the resorcine to a coarse powder. The ground resorcine is packed in a percolator and sufficient cold benzol is added to cover the powder. The ingredients are allowed to stand for a few hours, during which the phenol and catechol dissolve in the benzol. The solution of phenol and catechol in benzol is then drawn off. The solution remaining in the powdered resorcine is then displaced by the further addition of benzol. More specifically I prefer to proceed as follows: After the original volume of benzol is allowed to stand as described, the solution is allowed to flow out from the bottom very slowly and from time to time, as the level of the solution sinks to the top of the resorcine, add small fresh quantities of benzol, until the added volume of benzol equals (say) approximately the volume originally introduced. In this way, every particle of the resorcine is repeatedly washed with benzol. After a volume of the benzol solution about equal to the original volume of benzol has run off, the benzol is recovered from the solution by addition of caustic soda followed by distillation; the soda combining with any impurities of a phenolic nature and preventing the driving off of such impurities with the benzol. The wash remaining in the resorcine is comparatively pure benzol, so that, after it has been completely drained off, the resorcine is practically completely freed from the impurities specified. The wash is re-used in treating fresh quantities of resorcine. The powder is removed from the percolator, spread on pans or trays away from flame and dried at a temperature above the boiling point of benzol and below 100° C. to remove the last traces of benzol.

The product may be then further purified by crystallization or sublimation. It will be understood that these two methods of final purification are, for the purposes of the process, equivalent steps.

In claiming the process, it will be understood that it is intended to include the recovery of either phenol or catechol alone if the other impurity be not present.

Having now fully described my invention, what I claim and desire to protect by Letters Patent is:—

1. The process of purifying resorcine which comprises extracting the resorcine with cold benzol and subsequently subliming the resorcine.

2. The process of purifying resorcine which comprises dissolving out the phenol and catechol with cold benzol, drying the resorcine, and subsequently subliming the resorcine.

3. The process of purifying resorcine which comprises extracting the resorcine with cold benzol.

4. The process of freezing resorcine from phenol and catechol which comprises grinding the resorcine to a powder, dissolving out the phenol and catechol with cold benzol and drying the resorcine.

In testimony of which invention I have hereunto set my hand, at Brooklyn, N. Y., on this tenth day of December, 1920.

THURSTON N. DISSOSWAY.